United States Patent
Bahr et al.

(10) Patent No.: US 6,670,805 B1
(45) Date of Patent: Dec. 30, 2003

(54) DISPLACEMENT SENSOR CONTAINING MAGNETIC FIELD SENSING ELEMENT BETWEEN A PAIR OF BIASED MAGNETS MOVABLE AS A UNIT

(75) Inventors: Joseph K. Bahr, Elkhart, IN (US); Mont A. Johnson, Perry, UT (US)

(73) Assignee: Alliant Techsystems Inc., Edina, MN (US)

(*) Notice: Subject to any disclaimer, the term of this patent is extended or adjusted under 35 U.S.C. 154(b) by 0 days.

(21) Appl. No.: 09/961,211

(22) Filed: Sep. 21, 2001

Related U.S. Application Data
(60) Provisional application No. 60/234,341, filed on Sep. 22, 2000.

(51) Int. Cl.[7] .............................. G01B 7/00; G01B 7/14; G01D 5/12
(52) U.S. Cl. ................... 324/207.2; 324/207.24
(58) Field of Search .................. 324/207.13, 207.15, 324/207.2–207.24, 207.26, 251; 335/205–207; 338/32 H; 73/DIG. 3, 722, 728, 735; 200/82 E, 83 L

(56) References Cited
U.S. PATENT DOCUMENTS

| | | |
|---|---|---|
| 3,777,273 A | 12/1973 | Baba et al. |
| 4,361,805 A | 11/1982 | Narimatsu et al. |
| 4,535,289 A | 8/1985 | Abe et al. |
| 4,665,362 A | 5/1987 | Abel et al. |
| 4,810,965 A * | 3/1989 | Fujiwara et al. ........ 324/207.22 |
| 4,837,539 A * | 6/1989 | Baker ........................... 335/207 |
| 5,231,352 A * | 7/1993 | Huber .................... 324/207.24 |
| 5,313,182 A | 5/1994 | Blache |
| 5,325,869 A | 7/1994 | Stokes |
| 5,493,216 A | 2/1996 | Asa |
| 5,521,497 A * | 5/1996 | Schneider et al. ...... 324/207.22 |
| 5,617,023 A | 4/1997 | Skalski |
| 5,670,876 A | 9/1997 | Dilger et al. |
| 6,060,969 A * | 5/2000 | Hufgard et al. ............. 335/207 |
| 6,411,081 B1 * | 6/2002 | Spellman ............... 324/207.21 |

* cited by examiner

*Primary Examiner*—Gerard R. Strecker
(74) *Attorney, Agent, or Firm*—TraskBritt

(57) ABSTRACT

A displacement sensor for providing an indication of the position of a first body relative to a second body, the first body being displaceable relative to the second body in a displacement direction. The sensor is composed of: two magnets that are spaced from one another in the displacement direction to define therebetween a region containing a magnetic field; a magnetic field sensing element mounted in the region; and components for coupling at least one of the magnets to one of the bodies and the magnetic field sensing element to the other of the bodies to produce a relative displacement between the at least one magnet and the magnetic field sensing element in the displacement direction in response to displacement of the first body relative to the second body.

12 Claims, 2 Drawing Sheets

DISPLACEMENT SENSOR CONTAINING MAGNETIC FIELD SENSING ELEMENT BETWEEN A PAIR OF BIASED MAGNETS MOVABLE AS A UNIT

CROSS-REFERENCE TO RELATED APPLICATION

The benefit of priority is claimed of U.S. Provisional Application No. 60/234,341 filed in the U.S. Patent & Trademark Office on Sep. 22, 2000, the complete disclosure of which is incorporated herein by reference.

GOVERNMENT LICENSE CLAUSE

The U.S. Government has a paid-up license in this invention and the right in limited circumstances to require the patent owner to license others on reasonable terms as provided for by the terms of contract NAS 8-97238 with the National Aeronautics and Space Administration (NASA).

BACKGROUND OF THE INVENTION

The present invention relates to displacement, or position, sensors of the type having a movable element capable of being placed in contact with a component whose displacement is to be monitored, and particularly relates to displacement sensors constructed to monitor small amplitude displacements of the order of a fraction of an inch.

Displacement sensors of the type contemplated by the present invention are useful for a variety of purposes, one of which is the monitoring of movements experienced by parts of a structure for testing purposes.

BRIEF SUMMARY OF THE INVENTION

The invention provides a displacement sensor for providing an indication of the position of a first body relative to a second body, the first body being displaceable relative to the second body in a displacement direction. The sensor comprises two magnets that are spaced from one another in the displacement direction to define therebetween a region containing a magnetic field, with a magnetic field sensing element mounted in the region. The sensor further comprises means for coupling at least one of the magnets to one of the bodies and the magnetic field sensing element to the other of the bodies to produce a relative displacement between the at least one magnet and the magnetic field sensing element in the displacement direction in response to displacement of the first body relative to the second body.

BRIEF DESCRIPTION OF THE SEVERAL VIEWS OF THE DRAWING

The accompanying drawings are incorporated in and constitute a part of the specification. The drawings, together with the general description given above and the detailed description of the preferred embodiments and methods given below, serve to explain the principles of the invention. In such drawings.

DETAILED DESCRIPTION OF THE INVENTION

Reference will now be made in detail to the presently preferred embodiments and methods of the invention. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

Figure 1:
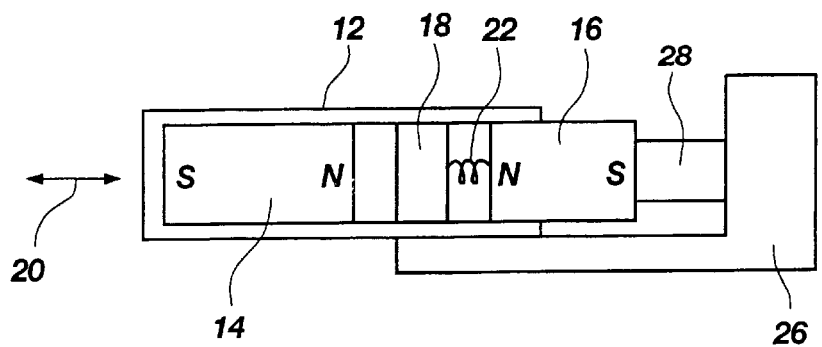
FIGS. 1, 2, and 3 are simplified pictorial views of three embodiments of the present invention.

FIG. 1 shows a first embodiment of the invention composed of a housing 12 which contains a first permanent magnet 14, a second permanent magnet 16 and a Hall effect sensor 18 interposed between magnets 14 and 16. Magnet 14 and sensor 18 are fixed in position within housing 12, while magnet 16 is mounted to be movable along the longitudinal axis of housing 12, in the direction of arrows 20. As is apparent from the drawing, magnet 16 is movable only in the direction of arrows 20.

A compression spring 22 is installed between magnet 16 and sensor 18 in order to bias magnet 16 away from sensor 18.

Magnets 14 and 16 are installed so that their magnetization directions are opposite to one another in order to produce a magnetic field at the location of sensor 18 that will vary as magnet 16 moves toward and away from magnet 14.

Housing 12 is fixed to a body 26 which includes a movable component whose displacement in the direction of arrows 20 relative to body 26 is to be measured. This component or an extension 28 thereof is coupled to the end of magnet 16 that is remote from sensor 18. Extension 28 may simply be in contact with magnet 16 to exert a pushing force thereon. Magnet 16 is held in position relative to extension 28 by the action of spring 22 as well as by the magnetic repelling force existing between magnets 14 and 16. Any movement of the part whose displacement is to be measured in the direction of arrows 20 produces a corresponding movement of magnet 16, thereby varying the distance between magnets 14 and 16. This produces a corresponding variation in the intensity of the magnetic field at the location of sensor 18. Sensor 18 produces a magnetic field sensing signal indicative of the distance between magnets 14 and 16, and thus indicative of the displacement of the part being monitored of extension 28.

Figure 2:
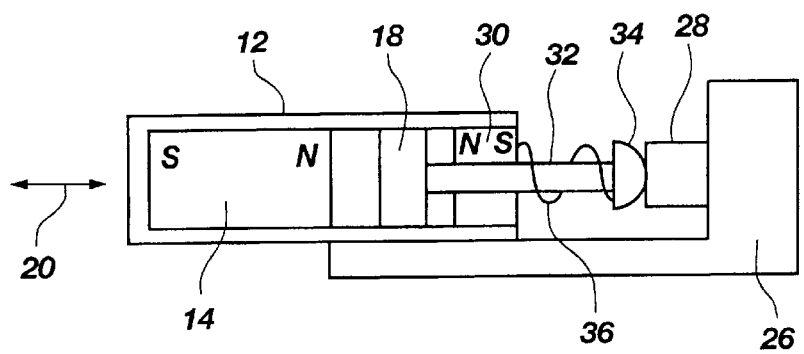

In the embodiment illustrated in FIG. 2, magnet 16 is replaced by a permanent magnet 30 which is fixed in position in housing 12, while sensor 18 is mounted to be movable within housing 12 in the direction of arrows 20. Sensor 18 is connected to a linkage, here in the form of a rod 32, which extends through a passage formed in magnet 30. The end of rod 32 that is remote from sensor 18 is provided with an enlarged contact head 34 which engages extension 28 of body 26. In order to maintain contact head 34 in contact with extension 28, a compression spring 36 is provided between magnet 30 and head 34. In this embodiment, both magnets 14 and 30 are fixed in position in housing 12, so that the distance therebetween is fixed, and the configuration of the magnetic field between magnets 14 and 30 is such that the response of sensor 18 to its displacement between magnets 14 and 30 will be substantially linear over much of its displacement range.

In place of, or in addition to, spring 36, contact head 34 can be provided with a magnet and extension 28 made in whole or in part of a magnetizable material. Alternatively, extension 28 can include a magnet and head 34 made of a magnetizable material. In either case, head 34 will be maintained in contact with extension 28 by a magnetic attractive force. According to a further possibility, spring 36 can be installed between magnet 14 and sensor 18.

Figure 3:
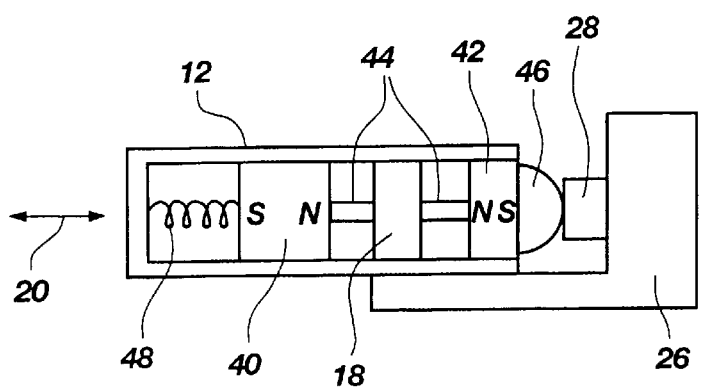

In the embodiment shown in FIG. 3, housing 12 is provided with an assembly of two magnets 40 and 42 which are joined together by a suitable connecting element 44, such as a rod. Magnets 40 and 42 are shown having polarities (N and S) arranged end-to-end along a common longitudinal axis, with the polarities of magnet 40 being arranged opposite to the polarities of magnet 42. Magnets 40 and 42 and element 44 are installed for movement as a unit within housing 12 in the direction of arrows 20, while sensor 18 is fixed in position with respect to housing 12. Magnet 42 carries a contact head 46 which bears against extension 28 and the assembly of magnets 40 and 42 and element 44 is biased toward extension 28 by a compression spring 48 located between the base of housing 12 and magnet 40. This embodiment operates in much the same manner as the embodiment of FIG. 2 in that the spacing between magnets 40 and 42 is fixed and the position of sensor 18 in the magnetic field between those magnets will vary as a function of the displacement of extension 28.

Figure 4:
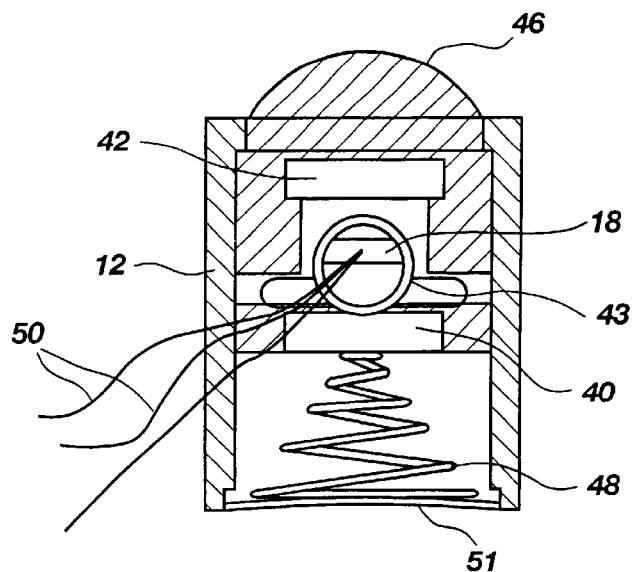
FIG. 4 is a cross-sectional view of a preferred embodiment of the invention.
Figure 5:
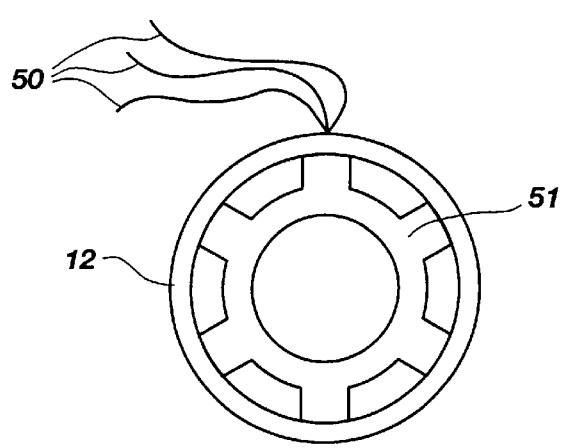
FIG. 5 is a detailed view of one component of the embodiment of FIG. 4.
Figure 6:
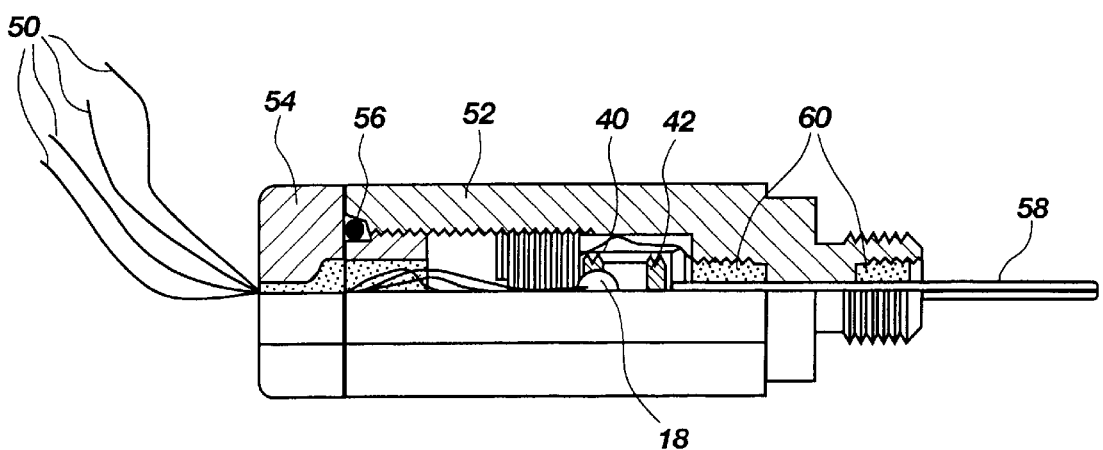
FIG. 6 is a partial cross-sectional view of a further embodiment of the invention.

Two forms of construction of the embodiment of FIG. 3 are illustrated in FIGS. 4–6, which also illustrate the signal-carrying conductors 50 that are connected to sensor 18 and that extend through a suitable passage in housing 12. Since sensor 18 is fixed in position relative to housing 12, the feeding of conductors 50 out of housing 12 is a simple matter.

The embodiment shown in FIGS. 4 and 5 includes a simple support structure 43 to hold sensor 18 at the desired position and a retaining clip 51 installed at the base of the housing 12 for supporting spring 48.

The embodiment shown in FIG. 6 is functionally similar to that of the embodiment of FIGS. 4 and 5. However, in the embodiment of FIG. 6, the housing is composed of a main body 52 and an end cap 54 which is screwed into a threaded passage in body 52, with a seal 56 interposed between body 52 and cap 54 in order to hermetically seal the region enclosed by body 52. An actuator 58 extends through a passage in the front end of the housing, which passage is sealed by two sealing rings 60 which surround actuator 58. Actuator 58 is coupled to magnets 40 and 42 and the outer end of actuator 58 can be given any desired configuration in order to contact the component whose displacements are to be monitored.

In preferred embodiments of the present invention, and particularly those illustrated in FIGS. 2–6, sensor 18 can be made to operate over a linear range by an appropriate selection of the spacing between the two permanent magnets and the physical size, or dimensions, of each magnet.

Displacement sensors according to the present invention are particularly useful for measuring displacements which occur over a small range, one application being for measuring displacements that extend over a range of the order of 0.1 inch. According to one preferred embodiment of the invention, use can be made of magnets 40 and 42, each having a diameter of 0.25 inch and a thickness of 0.06 inch with a spacing between the magnets of the order of 0.2 inch. With this arrangement, it was found experimentally that the magnetic field over a displacement range of 0.01 inch at a location midway between the magnets varied linearly with a deviation of less than 0.5% Each magnet 40, 42 can have a magnetic field strength that is typical for magnets made of conventional permanent magnetic material, it having been noted that the particular field strength employed will effect the magnitude of the output of sensor 18, but not the linearity of the magnetic field variation.

In order to improve the response of a displacement sensor according to the present invention, use can be made of Hall effect sensors that are temperature compensated for the magnets with which they are associated, thus taking into account the fact that the magnetic field of any magnet varies roughly linearly with temperature. The Hall effect sensor may be programmed to compensate for this temperature variation in order to maintain linearity over a reasonable temperature range, for example, of ~10 to 50° C.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are, therefore, to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A displacement sensor for providing an indication of the position of a body relative to a fixed location, the body being displaceable relative to the fixed location in a displacement direction, the displacement sensor comprising:

first and second magnets arranged along a longitudinal axis parallel to the displacement direction and spaced from one another by a fixed distance along the longitudinal axis to define therebetween a region containing a magnetic field, the first and second magnets each having respective polarities arranged on the longitudinal axis, the polarities of the first magnet arranged opposite to the polarities of the second magnet;

a magnetic field sensing element mounted in the region between the first and second magnets; and a biasing member positioned and oriented to provide a bias against at least one of the first and second magnets toward the body in a direction parallel to the displacement direction, wherein the first and second magnets are mutually positioned with an element extending therebetween so as to be displaceable as a unit in response to displacement of the body in the displacement direction relative to the fixed location against the bias provided by the biasing member.

2. The displacement sensor according to claim 1, wherein the biasing member is configured to provide a magnetic or a mechanical force sufficient to maintain contact between the at least one of the first and second magnets and the body.

3. The displacement sensor according to claim 1, wherein the magnetic field sensing element is a Hall effect sensor.

4. The displacement sensor according to claim 1, wherein the first and second magnets are permanent magnets.

5. The displacement sensor according to claim 1, wherein the element allows for the relative displacement between the first and second magnets and the magnetic field sensing element to occur only in the displacement direction.

6. The displacement sensor according to claim 1, wherein the biasing member includes a spring for urging the first and second magnets toward the body.

7. The displacement sensor according to claim 2, wherein the biasing member includes a spring for urging the first and second magnets toward the body.

8. The displacement sensor according to claim 3, wherein the biasing member includes a spring for urging the first and second magnets toward the body.

9. The displacement sensor according to claim 4, wherein the biasing member includes a spring for urging the first and second magnets toward the body.

10. The displacement sensor according to claim 5, wherein the biasing member includes a spring for urging the first and second magnets toward the body.

11. The displacement sensor according to claim 1, wherein at least one of the first and second magnets includes a contact head configured and located to contact the body.

12. The displacement sensor according to claim 1, wherein the magnetic sensing element is attached to an inside of a housing in which the first and second magnets are positioned to move along the longitudinal axis.

* * * * *